United States Patent Office 3,323,219
Patented June 6, 1967

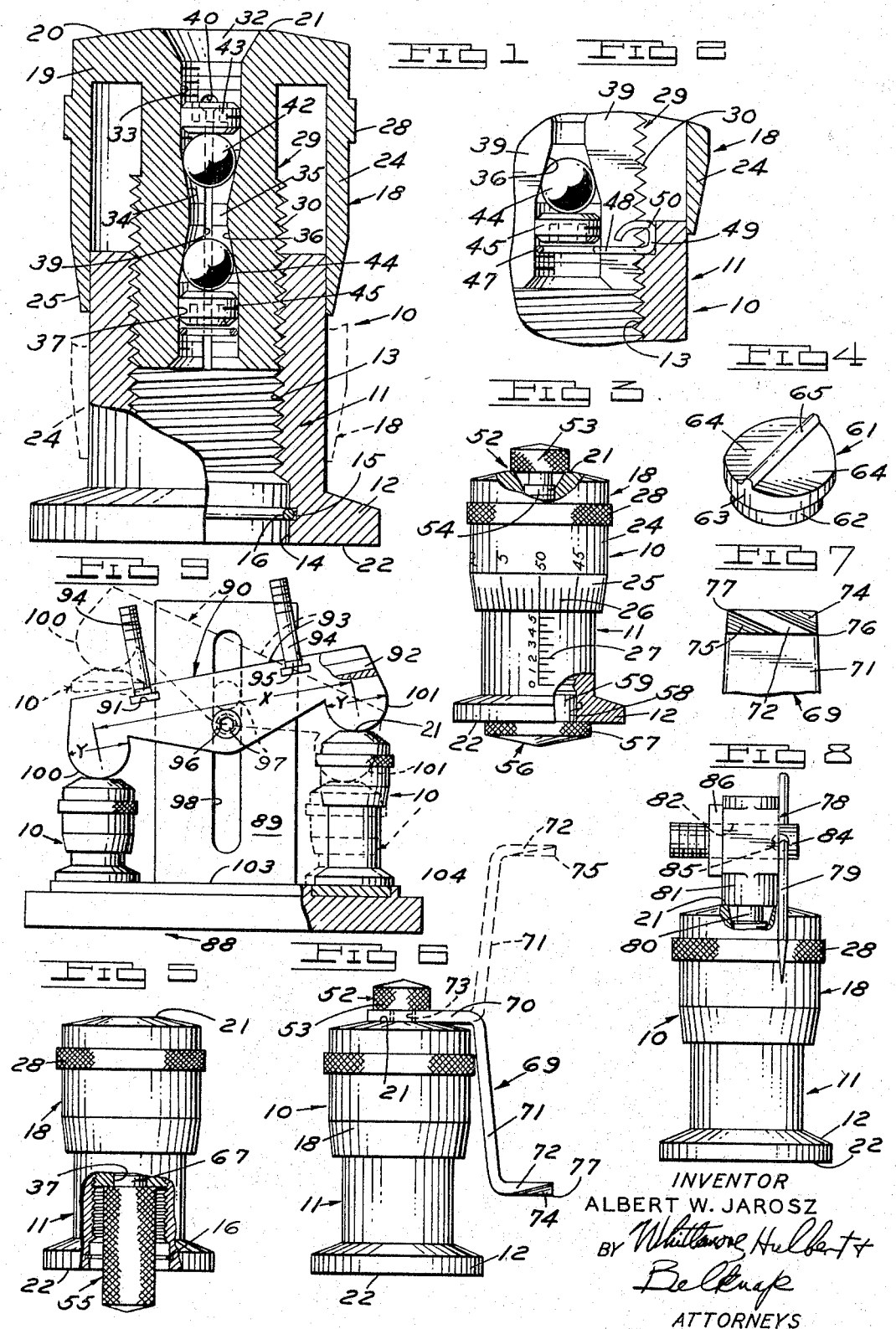

3,323,219
MICROMETER BASE GAUGE AND
RELATED EQUIPMENT
Albert W. Jarosz, 3675 Kanter, Detroit, Mich. 48211
Filed Apr. 2, 1964, Ser. No. 356,760
11 Claims. (Cl. 33—164)

The present invention relates to improvements in a micrometer base gauge and related equipment associated therewith for use in a great variety of gauging, measuring, checking, fitting and other high precision operations. These are in many instances presently performed with the assistance of gauge blocks, rendered unnecessary and even undesirable in use by the present gauge and associated parts. Basically, the present invention relates to improvements on and refinements over gauge equipment illustrated and described in my earlier Patents Nos. 2,344,878 of Mar. 21, 1944 and 2,426,933 of Sept. 2, 1947.

It is an object of the present invention to provide a high precision gauge suitable for use in measuring heights of parts with micrometer accuracy, or checking part dimensions, mounting the parts in relation to other equipment, scribing parts, assembling parts, setting tools and many different such operations, all with equal and dependable micrometer precision. Example of typical but by no means limiting applications of the improved gauge are as a height or depth gauge or measurer of other dimensions; as a precision support for a scriber; as an adjunct to convert a sine bar to function in substitution for known types of sine plate, but with added adaptability or versatility and convenience; as an instrument for use in conjunction with jigs and fixtures for the setting of work held by the latter in relation to drilling, shaping, milling or boring machines; as an aid in the making of dies; as a tool for use in assembling parts or checking or inspecting the same for accuracy of assembly or tolerance, and the like.

In respect to the gauge, proper, of the invention, it is an object to improve in various ways on the gauge of my above identified Patent No. 2,426,933, primarily in regard to its resistance to distortion under load, by reason of its improved means to rigidly lock a combined micrometer screw and thimble component to a barrel component telescoped by the former. For example, the improved gauge is sufficiently rugged and highly precisioned as to its parts that it will, even when unlocked by the means referred to, sustain an axial load of up to 100 pounds with a minus distortion of no more than 0.0005 inch; and when it is locked it will support up to 1,000 pounds load with the same maximum compressive distortion of 0.0005 inch.

It is, in general, an object of the invention to provide a micrometer gauge which has standardized means to receive at one or both of its axial ends a wide variety of supplemental adapter parts, such as to extend its versatility even more than is possible in the case of my last mentioned patent. For example, it is contemplated that end extension elements may be quickly and easily applied in fixed relation to the gauge proper to increase its overall length in single increments of its own minimum overall axial length. Thus, such length-extending components might individually be such as to add to the minimum gauge length, an increase of just ¼ inch, say, through various fractions up to lengths in any desired number of whole inches; thus, adapting a single gauge, itself manipulable to provide micrometer adjustments in length, to afford, within predetermined maxima, a pratically infinite number of gauge lengths for measuring, checking, scribing and other uses referred to above. As a further instance, it is contemplated that the application of special extensions on both opposite ends of the gauge proper will render it highly useful in measuring or checking inner diameters.

In accordance with the invention, extensions or adapters of a different sort may also be applied to one or both ends of the improved gauge. Thus one such adapter extensions might serve to mount a special scriber, or to mount a feeler gauge, or to serve as a linking instrumentality for the application to the basic gauge of many other types of instrument or special tool.

Further in regard to special equipment which may be associated with the gauge, I contemplate the provision of an improved scriber which, as optionally applied to the gauge in one position or in a reversal thereof, enables the gauge to become part of a high precision tool which will scribe upwardly from a base surface of a part, or downwardly toward such surface. This special scriber, which is of a Z-or-goosenneck shape is, per se, also one of the aspects of the invention.

Another important use contemplated for the improved gauge is in combination with a novel type of sine bar supported on a base plate member or fixture, and coacting with the precision gauge to duplicate any function performed by known sine plates, and with added convenience, speed and versatility.

In this connection, the invention also provides an improved sine bar for use as noted above.

Generally considered, it is an object of the invention to provide an improved gauge having a wide versatility for use with associated equipment to perform gauging functions heretofore done by resort to precision gauge blocks; yet which is proof against error introduced by thermal conductivity, to which gauge blocks are subject; the gauge and associated or related equipment of course being capable of uses never contemplated for gauge blocks.

The foregoing as well as other objects will become more apparent as this description proceeds, especially when considered in connection with the accompanying drawing illustrating the invention, wherein:

FIG. 1 is a view in enlarged scale, partially broken away and in axial section through a typical gauge according to the invention, showing the latter in solid line in an axially extended position from its fully compacted axial position, shown in dotted line;

FIG. 2 is a fragmentary view in axial section through the gauge at 90° to that of FIG. 1, illustrating an improvement in means to prevent separation of the thimble and micrometer screw component from the barrel component of the gauge;

FIG. 3 is a front elevational view of the gauge, giving the general external appearance of the latter, and being partially broken away and in axial section to illustrate the optional application thereto of extension elements, as for use in checking or measuring inner diameters.

FIG. 4 is a perspective view of an alternative embodiment of one of the extension elements of FIG. 3, particularly adapted for the I.D. work referred to;

FIG. 5 is a side elevational view, partially broken away and in axial section, depicting the application of an extension element of predetermined length to the gauge in a different way than in FIG. 3;

FIG. 6 is a side elevational view showing the gauge as associated with a special scribing tool, selective reversed positions of the scriber being indicated in solid and dotted line;

FIG. 7 is a fragmentary end view showing a portion of the scriber;

FIG. 8 similarly shows the association with the gauge of a special adapter end extension, serving as an adapter link or agency to extend the use of the gauge to a large variety of different auxiliary equipment, a scriber being actually shown; and FIG. 9 is a front elevational view showing the use of one or two of the improved gauges in conjunction with an improved sine bar supported on an appropriate base plate or fixture to duplicate the functions of known sine plates, the base plate being partially broken away and in vertical section.

First referring to FIGS. 1, 2 and 3, which best show basic features of the improver gauge, the latter is generally designated by the reference numeral 10. It comprises an upright tubular barrel 11 of substantial radial wall thickness and provided with an enlarged base flange 12 which is accurately finished flat on its bottom at a precise 90° to the axis of the barrel 11. The barrel is provided with internal precision threading 13 and, in a bottom counterbore 14 beneath such threading, barrel 11 has a circumferentially inner groove 15 adapted to receive a split friction ring 16, for a purpose to be described.

The reference numeral 18 generally designates a combined micrometer screw and thimble member which internally and externally telescopes the barrel 11. Member 18 has an axially thick top or cap portion 19, the upper surface of which is beveled in a frusto-cone 20 surrounding a center flat area 21 which is at precisely 90° to the axis of the gauge 10, hence precisely parallel with its bottom surface, designated 22.

A cylindrical thimble or sleeve 24 is formed integral with cap 19, depending a substantial axial distance therefrom into a sliding, externally telescoped fit about the upper end of barrel 11. As shown in FIG. 3, the thimble 24 has a bottom frusto-conical portion or skirt 25 bearing fifty designated calibrations 26, each indicating 0.001 inch. The barrel 11 also has designated, upwardly extending calibrations 27. Thimble 24 is externally knurled at 28 for ease in rotative manipulation.

In radially inwardly spaced relation to this thimble 24, the member 18 has an integral tubular micrometer screw, generally designated 29, which is externally threaded throughout a substantial axial length at 30 for mating engagement with the threading 13 of barrel 11.

The axial spacing and pitch of the threads 13 and 30 are such that a single whole rotation of the thimble on the barrel will result in an increase or decrease of the overall axial length of the gauge 10, proper, to the extent of 0.050 inch, as observable from the thimble calibrations 26. In its minimum contemplated zero setting, i.e., at the zero barrel calibration 27, such overall length of gauge 10 will be fixed and known, for example 1½ inch (as will be assumed for the illustrated gauge), or any other fixed and known length, say up to 2½ inches.

The tubular micrometer screw is internally formed to provide, in progression downwardly from the top therefrom, a frusto-conical upper upper counterbore 32 merging with a threaded bore 33, which in turn merges with a downwardly and inwardly tapered, frusto-conical seat or throat 34, which is unthreaded; then past a cylindrical center zone 35 and a downwardly and outwardly tapered frusto-conical throat or seat 36, also unthreaded, into mergence with a bottom threaded bore 37. A pair of diametrically opposed slots 39 are formed through the wall of micrometer screw 29, extending downwardly from an enlarged upper bay 40 through the bottom end of the screw, which slots impart radial flexibility to the screw.

An upper wedging ball 42 is disposed in the upper tapered throat or seat 34, and is adapted to be thrust downwardly against the latter by an Allen set screw 43 threaded in bore portion 33; while a similar wedging ball 44 is adapted to be urged upwardly against the lower seat 36 by means of a second Allen set screw 45 threaded in bore portion 37.

Thus, by selectively manipulating either of the set screws 43, 45 from one end or the other of the gauge (as may be most conveniently accessible) the ball 42 or the ball 44, or both, may be thrust against the respective seats 34, 36 to expand the split flexible micrometer screw 29 into tight gripping engagement with the threading 13 of the outer barrel member 11. This may be done in any of the elevated positions (solid line in FIG. 1) of the combined thimble and screw part 18, or its fully lowered position shown in dotted line in that figure.

Due to the dual acting locking ball provisions of the present improvement, the gauge 10, in the instanced size of 1½ inch minimum height, is capable of sustaining axial compressive loads far in excess, to my knowledge, of prior gauges of a generally similar type. That is, with the balls 42, 44 released from wedging engagement with their tapered seats, the gauge 10 will hold up to 100 pounds with a compressive distortion of less than 0.0005 inch. When one or the other of the balls are wedged firmly against its tapered seat, the gauge supports up to 1,000 pounds compressive load, with the maximum distortion of 0.0005 inch.

The invention also contemplates improvements in simple wire spring means for preventing axial separation of the gauge members 11 and 18 from one another when fully extended, as best shown in FIG. 2. To this end, a resilient wire element 47 has a split coil disposed in the lower threaded bore portion 37 of micrometer screw 29, beneath the lower set screw 45; and the wire coil 47 has an integral arm 48 extending radially outwardly through one of the slots 39 in the screw member. At its outer end, the arm 48 is formed into a reversely turned loop 49; and when the combined thimble-screw member 18 is threadedly extended to an intended maximum, the loop 49 will snap into an inclined ramp-sided recess 50 opening inwardly of the wall of barrel member 11. It thus engages an upright side of the recess, binding its wire coil against the screw bore thread 37 to prevent further turning in the retractile direction. The enlargement afforded by the terminal radial loop 49 enables the anti-separation wire element 47 to withstand strong twisting stresses such as might otherwise result in its failure.

Used alone, the improved gauge 10 affords all of the advantages of that of my earlier patents identified above, plus increased strength in the different respects mentioned above. Its field of utility is still further extended by the use therewith of one or more of a set of extension or adapter pieces, as contemplated by the invention, typical examples of which appear in FIGS. 3 through 8 of the drawing.

Thus, referring to FIG. 3, one may employ a single extension piece such as is designated 52 in that figure. This piece has a knurled upper finger part 53 and a bottom stem 54 threaded to mate with the upper threaded bore portion 33 of combined thimble and screw member 18. The dimension of the finger part 53 from its flat bottom of the apex of its mildly conical top is chosen in a precise fraction of an inch, i.e., ¼ inch as depicted in FIG. 3, so that when in place in the gauge bore 33 it extends the overall length of gauge 10 by exactly that amount.

Pursuant to the invention, a number of these extension pieces are contemplated for use with the basic gauge 10; and they will be furnished in axial dimensions above their threaded stem 54 of different exact fractions (½) of an inch, whole inches and/or inch-plus fractions. That is, the axial length of the smallest piece is an aliquot part of the corresponding length of the other piece or pieces, thus allowing any desired incremental-inch adjustment of the gauge length, plus any micrometer adjustment in thousandths of an inch within the overall length range. One such longer extension appears in FIG. 5, being generally designated 55, to which reference will be hereinafter made.

FIG. 3 also shows the use of a somewhat different type of extension piece, generally designated 56, at the bottom of the gauge. Again, its knurled finger part 57, of substantially greater diameter than the finger part 53, is of an exact fractional dimension from its flat top to the apex of its conical bottom, for example ¼ inch; although this may be altered as suggested above, also.

In order to receive the extension piece 56, the barrel member 11 has the smooth-walled cylindrical bore 14 opening through its bottom; and finger part 57 has a cylindrical plug portion 59 slidingly received in bore 14. As thus received, the split friction retainer spring 16 (FIG. 1) in the internal groove 15 of the bore 14 exerts retaining action on the bottom finger part to prevent its accidental separation from gauge 10 proper.

Thus, a tool 10 equipped with end extension pieces 52, 56, per FIG. 3, may be used in the gauging, checking or measuring of inner diameters. In doing this, the tool is inserted within the annulus in question, then rocked while being longitudinally micrometer-adjusted, until its extensions take true diametrical engagement across the opening.

FIG. 4 represents a further specific improvement in an I.D. checking end extension, generally designated 61. Here, the extension has an integral cylindrical plug element 62 releasably mountable in the gauge barrel bore 14, and an enlarged head portion 63, adapted to laterally overlap the flat bottom gauge surface 22. Head 63 has its end defined by a pair of flat surfaces 64 diverging laterally away from an integral raised ridge portion 65, which extends diametrically across the head portion 63 between inclined surfaces 64. The use of this special extension piece 61 considerably facilitaties the making of I.D. measurements or checks, since the straight ridge element 65 may be positioned along the length of the bore being checked, at its valley and parallel with its axis; and the tool to which the extension 61 is applied need only then be rocked about ridge portion 65, in a plane at 90° to the bore axis, while engaging the opposite end extension with a diametrically opposite valley point on the bore surface.

An extension piece as shown in FIG. 4 can also be nestingly located in a keyway to facilitate a check on a keyed part.

FIG. 5 of the drawing shows an alternative adaptation of the extension piece 55, mentioned above to the gauge. In this instance its threaded stem 67 is mated with the downwardly opening threaded bore portion 37 of micrometer screw member 29, the extension piece 65 being knurled and being of sufficient axial length to project downwardly of the flat bottom surface of gauge 10.

Thus the gauge may be converted to a depth gauge; and inside dimensions or distances from surface to surface are readily measured precisely with the gauge 10, as quickly altered to incorporate extension 55.

Gauge 10 is also adapted to serve as a scriber, by associating therewith an improved type of scriber element 69, as shown in FIGS. 6 and 7. This element is generally Z-shaped or goosenecked in outline, including an upper mounting arm 70 projecting laterally in one direction from an intermediate portion 71, and a scriber arm 72 projecting in the opposite lateral direction from that arm. The arms 70, 72 are parallel to one another.

The mounting arm 70 is provided with a central hole 73 to receive an extension piece 52 for the mounting of scriber 69 to the top of the gauge 10, as described above in connection with FIG. 3. The opposite scriber arm 72, which is of the identical thickness of mounting arm 70, is also flat, like the latter; and arm 72 is ground at 74 and 75, as shown in FIG. 7, to provide scriber knife edges 76, 77, respectively, at opposite sides of scriber arm 72, which knife edges are spaced vertically from one another by the thickness of scriber arm 72.

Thus, as mounted by an extension piece 52 to the top of gauge 10, the scriber 69 may be disposed to extend downwardly (solid line in FIG. 6) to scribe at a predetermined level above the base surface supporting an object or, as reversely positioned (dotted line) to scribe upwardly above gauge 10 to a desired elevation on an object. In one position, one of the knife edges 76, 77 will be employed to make the scribe mark, and the other to make the mark in the inverted position of the scriber; and the vertical spacing of the knife edges relative to one another compensates out for the thickness of mounting arm 70. Therefore, a given setting of gauge 10 permits the making of lower and higher scribe marks which are positioned precisely the same distance below or above, respectively, the top surface 21 of combined thimble and screw member 18 of the gauge.

FIG. 8 shows the use of still another type of extension piece, generally designated 78, in association with the improved scriber. In this case, the extension 78 is employed as an adapter for mounting a further tool, instrument or implement to the gauge, such part being typically shown as a downwardly extending scriber element 79. Adapter extension piece 78 is provided with a bottom threaded stem 80 threadedly receivable in the top bore portion 33 of the gauge, and a main body portion 81 which abuts flush downwardly against top gauge surface 21. Body 81 has a transverse opening or bore 82 therethrough which is adapted to receive a threaded stem 84; and this stem in turn has an opening 85 to receive the shank of scriber 79. A nut 86 threadedly engages stem 84 at the opposite side of adapter body 81 to lock the scriber 79 fixedly atop the gauge 10.

Needless to say, an adapter extension such as that of FIG. 8 may be employed to mount many different types of auxiliary tool or instrument to the gauge proper, such as different types of scriber, feeler or dial indicator gauges, or the like. The adapter serves as a link means for all such implements, providing a precise mount thereof on a gauge 10 whose length may be otherwise altered by resort to other types of extension pieces, and which has micrometer precision adjustment within its length range.

FIG. 9 of the drawing illustrates a still further use of a gauge or gauges 10 according to the invention as a component of a sine plate set performing all of the functions of a known type of sine plate, and in an easier manipulated and more expeditious manner. The parts of this set consist of one or two of the gauges 10, a mounting bracket or fixture member, generally designated 88, having an integral rear upright member 89, and a special and improved type of sine bar 90.

This sine bar is provided with a plurality of transverse and longitudinally undercut or dovetail slots 91, 92, respectively, beneath its perfectly flat and true top surface 93, which slots are adapted to selectively or optionally receive in any desired position any desired number of headed T-bolts or studs 94, each of which has a squared shank portion 95 slidably received in the upper zone of the slot 91 or 92. Bolts 94 enable a work or other piece (not shown) to be rigidly and accurately clamped to the top surface 93 of sine bar 90.

At its exact center point, the sine bar 90 is provided with a counterbored transverse hole 96 extending horizontally therethrough, which hole accommodates an Allen type screw or bolt 97 to extend through a vertically elongated upright slot 98 in bracket upright 89; and an appropriate nut is applied to the bolt to hold the sine bar in any position of angular adjustment and/or vertical elevation in slot 98. The opposite ends of the sine bar, equidistant from the center bolt hole 96, are formed to provide bottom fulcrum or rocker portions 100, 101, respectively, shown as being generally semi-circular or semi-cylindrical of diameter Y; and the center points of rocker formations 100 are precisely spaced longitudinally from one another, a distance X, which is an even multiple of the diametral dimension Y. For the illustrated sine bar 80, dimension Y may be considered to be exactly one inch and dimension X to be exactly five inches.

The bracket or fixture 88 has an accurately flat top surface 103 at precisely 90° to its upright 89; and permanent magnet elements 104 are embedded in surface 103, being accurately flush at their tops with the latter on either opposite side of upright 89. These magnets serve to hold a gauge 10, or a pair of gauges, firmly in place on the bracket for the checking or inspection of a workpiece on sine bar 90, or for the machining of such piece, as by grinding, drilling or milling.

In use, one rocker fulcrum 100 or 101 may be positioned directly upon a magnet element 104, and the other rocker positioned atop the upper surface 21 of a gauge 10, or both rocker formations 100, 101 may be supported upon such surface of two gauges 10, as shown in FIG. 9. In order to attain a desired angle of the sine bar surface 90, it is then only necessary to turn the micrometer screw of one of the gauges up or down, as indicated in solid and dot-dash line in FIG. 9. For a sine bar 90 proportioned with the respective five inch dimension X and one inch dimensions Y, a 1° change in angularity of sine bar surface 93 is obtained by an up or down change in elevation of overall gauge height amounting to 0.0875 inch; and the range may be extended vertically between zero and 90° by corresponding multiplication, by degrees, of the 0.0875 inch change factor. Of course, in the case of sine bars proportioned otherwise than as instanced, the ratio of height adjustment to change of angle will differ.

Advantages of the combined micrometer gauge-sine plate unit or set of FIG. 9 reside in its extreme inexpensiveness of production, as well as in its ease and speed of manipulation. For example, since the sine bar 90 may swing in either angular direction about a pivot at bolt 97, it is unnecessary to reset the same otherwise than by a reversal of swinging inclination, in order to accommodate the sine plate unit to the handling of both left and right hand pieces. This represents a factor of increased ease of use, as compared with known sine plates, in which one end is pivoted and the opposite end lifts.

It will be seen from the foregoing that the invention affords a micrometer gauge 10 having improved qualities of strength and reliable precision, combined with compactness and low production cost, which gauge is also capable of fast and versatile use, as a component of a set, in combination with various types of extension or linking adapter, scriber and/or sine bar components, thus to adapt the gauge to many different applications in the checking, inspecting, measuring, mounting, assembling, installing, etc. of parts.

What I claim as my invention is:

1. A gauge of the type described, comprising a tubular barrel member having internal threading between opposite axial ends thereof, a tubular screw member matingly engaging said threading at one of said ends thereof, the bore of said screw member being formed to provide axially opposed, frusto-conical seats converging toward one another, the wall of said screw member having at least one axially elongated radial, flexibility-imparting slot therethrough paralleling the axis thereof, said slot extending axially through one end of the screw member from a point spaced inwardly of the opposite end of the latter, a pair of balls in said bore wedgingly engageable with the respective seats, said bore having threaded end portions extending from adjacent the respective seats to the respective opposite bore ends, and a pair of screw elements in said threaded bore portions independently and selectively engageable with the respective balls from opposite axial directions to wedge said screw member outwardly and lock the same against the threading of the barrel member, the bore of said tubular barrel member being provided adjacent the other of said opposite axial ends thereof with an annular friction element to releasably retain an extension piece in the barrel member in slidably removable, non-threaded engagement with the barrel member.

2. A gauge of the type described, comprising a tubular barrel member having internal threading between opposite axial ends thereof, a tubular screw member matingly engaging said threading at one of said ends thereof, the bore of said screw member being formed to provide axially opposed, frusto-conical seats converging toward one another, the wall of said screw member having at least one axially elongated radial, flexibility-imparting slot therethrough paralleling the axis thereof, said slot extending axially through one end of the screw member from a point spaced inwardly of the opposite end of the latter, a pair of balls in said bore wedgingly engageable with the respective seats, said bore having threaded end portions extending from adjacent the respective seats to the respective opposite bore ends, and a pair of screw elements in said threaded bore portions independently and selectively engageable with the respective balls from opposite axial directions to wedge said screw member outwardly and lock the same against the threading of the barrel member, the bore of said tubular barrel member being provided adjacent the other of said opposite axial ends thereof with an annular friction element to releasably retain an extension piece in the barrel member in slidably removable, non-threaded engagement with the barrel member, said threaded end portions of said screw member being sized to threadedly receive other extension pieces.

3. A gauge of the type described, comprising a tubular barrel member having internal threading between opposite axial ends thereof, a tubular screw member matingly engaging said threading at one of said ends thereof, the bore of said screw member being formed to provide axially opposed, frusto-conical seats converging toward one another, the wall of said screw member having at least one axially elongated radial, flexibility-imparting slot therethrough paralleling the axis thereof, said slot extending axially through one end of the screw member from a point spaced inwardly of the opposite end of the latter, a pair of balls in said bore wedgingly engageable with the respective seats, said bore having threaded end portions extending from adjacent the respective seats to the respective opposite bore ends, a pair of screw elements in said threaded bore portions independently and selectively engageable with the respective balls from opposite axial directions to wedge said screw member outwardly and lock the same against the threading of the barrel member, and an annular wire retainer disposed in the threaded bore portion adjacent said one end of the screw member, said retainer having a radial part extending through the slot of the screw member and provided with an enlarged terminal loop, said barrel having a radially inwardly facing recess to receive said loop and prevent threading separation of the screw member from the barrel member, the bore of said tubular barrel member being provided adjacent the other of said opposite axial ends thereof with an annular friction element to releasably retain an extension piece in the barrel member in slidably removable, non-threaded engagement with the barrel member.

4. A gauge of the type described, comprising a tubular barrel member having internal threading between opposite axial ends thereof, a tubular screw member matingly engaging said threading at one of said ends thereof, the bore of said screw member being formed to provide axially opposed, frusto-conical seats converging toward one another, the wall of said screw member having at least one axially elongated radial, flexibility-imparting slot therethrough paralleling the axis thereof, said slot extending axially through one end of the screw member from a point spaced inwardly of the opposite end of the latter, a pair of balls in said bore wedgingly engageable with the respective seats, said bore having threaded end portions extending from adjacent the respective seats to the respective opposite bore ends, a pair of screw elements in said threaded bore portions independently and selectively engageable with the respective balls from opposite axial directions to wedge said screw member outwardly and lock the same against the threading of the barrel member, and annular wire retainer disposed in the threaded bore portion adjacent said one end of the screw member, said retainer having a radial part extending through the slot of the screw member and provided with an enlarged terminal loop, said barrel having a radially inwardly facing recess to receive said loop and prevent threading separation of the screw member from the barrel member, the bore of said tubular barrel member being povided adjacent the other of said opposite axial ends thereof with an annular friction element to releasably retain an extension piece in the barrel member in slidably removable, non-threaded engagement with the barrel member, said threaded end portions of said screw member being sized to threadedly receive other extension pieces.

5. The combination with a micrometer gauge including threadedly engaged, outer barrel and inner screw members, the latter of which has a bore internally threaded at an end thereof, of an extension piece having a threaded end engageable in said threaded bore end of said screw member, and a scriber of generally Z-shaped outline providing a scriber arm and a mounting arm connected by an intermediate portion, said scriber arm being of generally flat cross section and having oppositely facing scriber knife edges formed thereon at opposite sides thereof, said edges being spaced from one another across the thickness of the scriber arm, said mounting arm having a hole to receive the threaded end of said extension piece, as applied to the threaded end of the barrel member bore, to mount said scriber on the gauge.

6. The combination with a micrometer gauge including threadedly engaged, outer barrel and inner screw members, the latter of which has a bore internally threaded at its opposite ends, of a set of extension pieces each having a threaded end selectively engageable in one or the other of the threaded ends of the bore of said screw member, and a scriber of generally Z-shaped outline providing a scriber arm and a mounting arm connected by an intermediate portion, said scriber arm being of generally flat cross section and having oppositely facing scriber knife edges formed thereon at opposite sides thereof, said edges being spaced from one another across the thickness of the scriber arm, said mounting arm having a hole to receive the threaded end of the barrel member bore, to mount said scriber on the gauge.

7. For use in association with a micrometer gauge, a reversible scriber of generally Z-shaped outline providing a scriber arm and a generally parallel mounting arm connected to one another by an intermediate portion, said arms projecting oppositely from said portion, said mounting arm having a hole therein to receive means for mounting the scriber to the gauge applied to a threaded end of the barrel member bore to mount said scriber on the gauge, said scriber arm being of generally flat-cross section and having oppositely facing scriber knife edges formed thereon at opposite sides thereof, said edges being spaced from one another across the thickness of the scriber arm.

8. The combination with a micrometer gauge including threadedly engaged, outer barrel and inner screw members, the latter of which has a bore extending axially therethrough and is internally threaded at its opposite ends, the outer barrel member also having a bore opening through an end of the gauge, of a set of extension pieces including pieces each having a threaded end selectively engageable in one or the other of the threaded ends of the bore of said screw member, and a further extension piece removably receivable in the end of the bore of said barrel member, said pieces projecting axially and oppositely outwardly of the respective ends of the gauge to extend the overall axial length of the latter said extension pieces being of different axial length outwardly of said threaded ends thereof, said axial length of the smallest piece being an aliquot part of the corresponding axial length of the other piece or pieces.

9. The combination of claim 8, in which said barrel member bore has means to frictionally hold said further extension piece therein.

10. The combination of claim 8, in which said further extension piece is generally conical in outline at an end thereof.

11. The combination of claim 8, in which said further extension piece has end surfaces at an end thereof tapering oppositely from a raised central ridge portion extending across said end.

References Cited
UNITED STATES PATENTS

| | | | |
|---|---|---|---|
| 2,426,933 | 9/1947 | Jarosz | 33—170 |
| 2,517,846 | 8/1950 | Craig | 33—170 |
| 2,645,026 | 7/1953 | Trbojevich | 33—174 |
| 2,768,448 | 10/1956 | Rineer | 33—170 |
| 2,869,242 | 1/1959 | Dwyer | 33—174 |
| 3,018,557 | 1/1962 | Nakata | 33—170 |

FOREIGN PATENTS

| | | |
|---|---|---|
| 9,561 | 1804 | Great Britain. |
| 125,908 | 8/1949 | Sweden. |

LEONARD FORMAN, *Primary Examiner.*

ROBERT B. HULL, *Examiner.*

W. D. MARTIN, *Assistant Examiner.*